(12) United States Patent
Bigbee-Hansen et al.

(10) Patent No.: US 10,029,781 B2
(45) Date of Patent: Jul. 24, 2018

(54) SHAPE MEMORY ALLOY-ACTUATED PROPELLER BLADES AND SHAPE MEMORY ALLOY-ACTUATED PROPELLER ASSEMBLIES

(71) Applicant: The Boeing Company, Chicago, IL (US)

(72) Inventors: William J. Bigbee-Hansen, Renton, WA (US); Dan J. Clingman, Milton, WA (US); James H. Mabe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 351 days.

(21) Appl. No.: 14/816,444

(22) Filed: Aug. 3, 2015

(65) Prior Publication Data

US 2017/0036752 A1 Feb. 9, 2017

(51) Int. Cl.
*B64C 11/06* (2006.01)
*B64C 11/20* (2006.01)
(Continued)

(52) U.S. Cl.
CPC .............. *B64C 11/06* (2013.01); *B64C 11/20* (2013.01); *B64C 11/30* (2013.01); *B64C 11/44* (2013.01);
(Continued)

(58) Field of Classification Search
CPC . B64C 2027/7288; B64C 11/30; B64C 11/44; B64C 2027/7205; B64C 2027/7216; F03G 7/065; F05D 2300/505
(Continued)

(56) References Cited

U.S. PATENT DOCUMENTS 2,118,652 A * 5/1938 Meijer .................... B64C 11/34
416/155
2,471,953 A 5/1949 Hamilton
(Continued)

OTHER PUBLICATIONS

European Patent Office, "Extended European Search Report" issued in connection with application No. 16171216.1 dated Dec. 16, 2016, (8 pages).

*Primary Examiner* — Dwayne J White
*Assistant Examiner* — Topaz L Elliott
(74) *Attorney, Agent, or Firm* — Hanley, Flight & Zimmerman, LLC

(57) ABSTRACT

Shape memory alloy-actuated propeller blades and shape memory alloy-actuated propeller assemblies are disclosed. An example propeller blade includes a propeller body, a plate coupled to the propeller body, a torque transfer member, and a shape memory alloy (SMA) actuator. The torque transfer member has a distal end attached to the plate such that the torque transfer member applies to the plate at least a portion of a torque applied to the torque transfer member at a proximal end of the torque transfer member. The SMA actuator has a distal end and a proximal end. The distal end of the SMA actuator is attached to the torque transfer member. The proximal end of the SMA actuator is coupled to the propeller body such that the distal end is mated to the propeller body. The SMA actuator is configured to apply the torque to the proximal end of the torque transfer member in response to an application of heat to the SMA actuator.

11 Claims, 9 Drawing Sheets

(51) Int. Cl.
  *B64C 11/44* (2006.01)
  *B64C 11/30* (2006.01)
  *B64C 27/72* (2006.01)
(52) U.S. Cl.
  CPC .............. *B64C 2027/7288* (2013.01); *F05D 2300/505* (2013.01); *Y02T 50/34* (2013.01)
(58) Field of Classification Search
  USPC ......................................... 416/147, 159, 162
  See application file for complete search history.

(56) References Cited

U.S. PATENT DOCUMENTS

| | | | |
|---|---|---|---|
| 3,106,369 A * | 10/1963 | Borst ........................ | B64C 9/38 244/52 |
| 3,586,262 A * | 6/1971 | Sherman ............. | B64C 29/0033 244/215 |
| 4,899,641 A * | 2/1990 | Khan ....................... | B64C 27/54 416/114 |
| 6,465,902 B1 * | 10/2002 | Beauchamp ............ | F01D 5/148 244/215 |
| 6,499,952 B1 | 12/2002 | Jacot et al. | |
| 8,070,446 B2 * | 12/2011 | Potter ................... | F03D 7/0224 290/55 |
| 8,235,324 B1 * | 8/2012 | Birch ....................... | B64C 27/68 244/17.25 |
| 8,608,441 B2 * | 12/2013 | Hotto .................... | F03D 1/0608 416/42 |
| 9,248,909 B2 * | 2/2016 | Eller ....................... | B64C 27/80 |
| 2006/0049302 A1 * | 3/2006 | Kennedy ................ | B64C 27/473 244/17.11 |
| 2015/0104314 A1 | 4/2015 | Zamponi et al. | |
| 2016/0152331 A1 * | 6/2016 | Haslach .................. | B64C 27/72 416/159 |

* cited by examiner ly, to shape memory alloy propeller blade
SHAPE MEMORY ALLOY-ACTUATED PROPELLER BLADES AND SHAPE MEMORY ALLOY-ACTUATED PROPELLER ASSEMBLIES

FIELD OF THE DISCLOSURE

This disclosure relates generally to propeller blades, and, more particularpitch trimming and shape memory alloy-actuated propeller blades.

BACKGROUND

Propellers that are used to provide thrust for platforms such as airplanes, have a blade angular setting or pitch that can be fixed for variable speed systems or variable for variable pitch constant speed systems. In variable speed systems, blade pitch is used to control engine speed. Thrust is varied by adding more fuel, which increases torque to the propeller, thereby increasing its speed. Blade pitch is then increased to reduce speed to the desired value while simultaneously increasing thrust. Fixed pitch propellers have a constant angular position and require engine speed changes to change thrust. When fuel is added, the engine speed increases and the thrust from the propeller increases.

The drawback for variable pitch propellers is that the variable pitch mechanisms are complicated and add weight. Known apparatus for varying a blade pitch include using mechanical actuators and linkages connected to the propeller blades. Such known apparatus are complex to design and set up and require constant operation to maintain engine speed control. When using such known actuators, if the mechanical actuator fails, the blade pitch and, thus, the engine speed are no longer controllable. The disadvantage of a fixed propeller is that the optimum performance is compromised because the design point is fixed at a particular engine speed, forward speed, and engine power level. These conditions happen at only one flight condition.

SUMMARY

A disclosed example propeller blade includes a propeller body, a plate coupled to the propeller body, a torque transfer member, and a shape memory alloy actuator. The torque transfer member has a distal end attached to the plate such that the torque transfer member applies to the plate at least a portion of a torque applied to the torque transfer member at a proximal end of the torque transfer member. The shape memory alloy actuator has a distal end and a proximal end. The distal end is attached to the torque transfer member. The proximal end of the shape memory alloy actuator is coupled to the propeller body and the distal end is mated to the propeller body. The shape memory alloy actuator is configured to apply the torque to the proximal end of the torque transfer member in response to an application of heat to the shape memory alloy actuator.

A disclosed example propeller assembly includes a propeller hub and a propeller blade attached to the propeller hub. In a disclosed example, the propeller blade includes a propeller body, a plate coupled to the propeller body, a torque transfer member, and a shape memory alloy actuator. The torque transfer member has a distal end attached to the plate such that the torque transfer member applies to the plate at least a portion of a torque applied to the torque transfer member at a proximal end of the torque transfer member. The shape memory alloy actuator has a distal end and a proximal end, the distal end is attached to the torque transfer member, the proximal end of the shape memory alloy actuator is coupled to the propeller body such that the distal end is mated to the propeller body, the shape memory alloy actuator is configured to apply the torque to the proximal end of the torque transfer member in response to an application of heat to the shape memory alloy actuator.

Another disclosed example propeller assembly includes a propeller hub, a propeller blade attached to the propeller hub via a bearing assembly. The propeller blade includes a propeller body and a shape memory alloy actuator and a heater. The shape memory alloy actuator has a proximal end and a distal end. The distal end of the shape memory alloy actuator is mated to the propeller blade and the proximal end of the shape memory alloy actuator is mated to the propeller hub such that, when heated, the shape memory alloy actuator causes the propeller blade to rotate about an axis extending through the shape memory alloy actuator. The heater applies heat to the shape memory alloy actuator.

Figure 1:
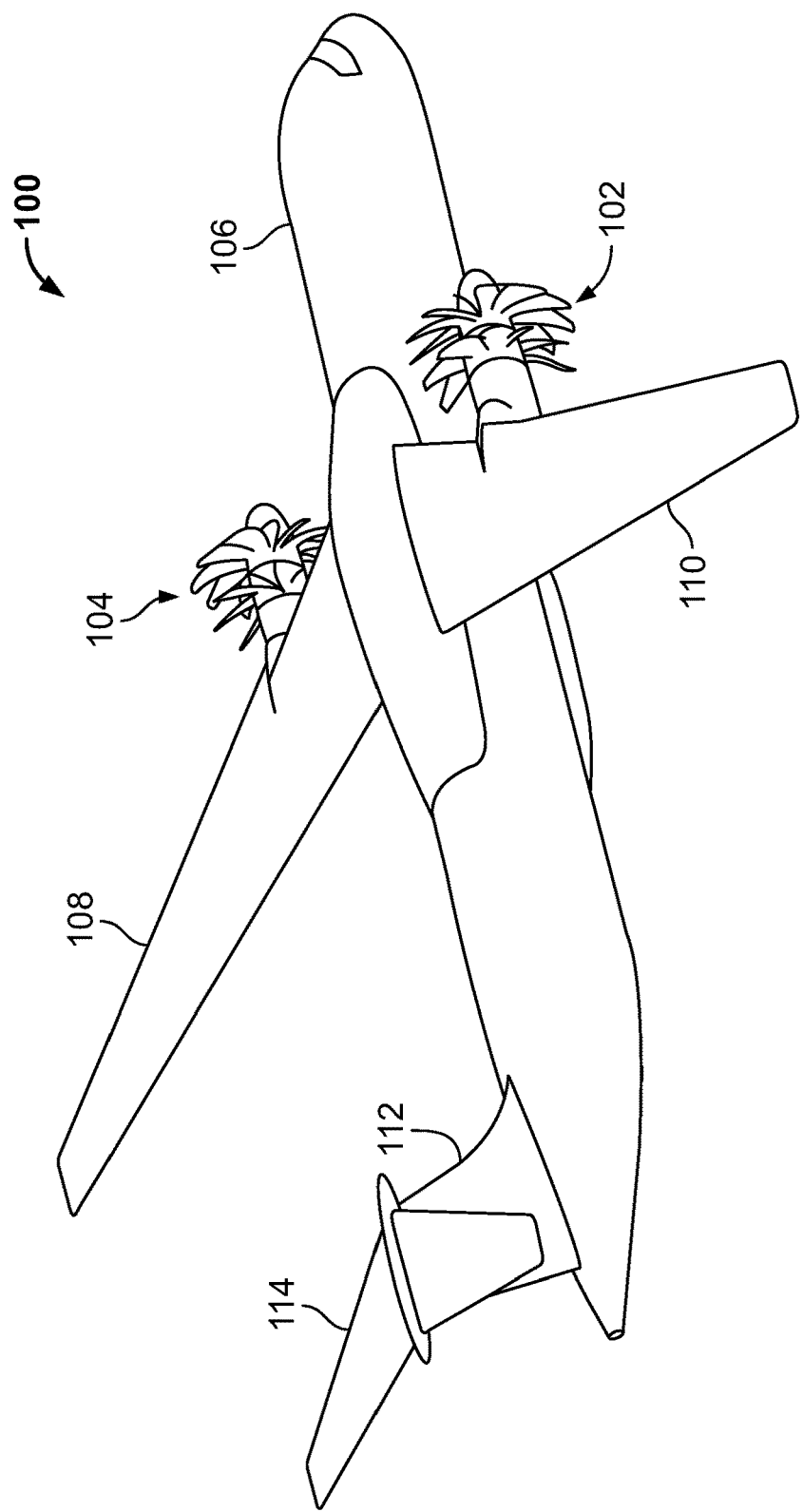
FIG. 1 is a diagram of an example aircraft that includes shape memory alloy-actuated propeller blades constructed in accordance with the teachings of this disclosure.

The figures are not to scale. Instead, to clarify multiple layers and regions, the thickness of the layers may be enlarged in the drawings. Wherever appropriate, the same reference numbers are used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s)

located therebetween. Stating that any part is in contact with another part means that there is no intermediate part between the two parts.

DETAILED DESCRIPTION

Examples disclosed herein use a shape memory alloy (SMA) actuator to vary an angle of attack (or blade pitch) for a propeller blade. In some disclosed examples, the SMA actuator has a generally tubular shape and applies torque in response to the application of heat by a heat management system. Disclosed examples may be used to adjust (e.g., trim) a blade angle of attack for one or more propeller blades in a propeller assembly according to a selected portion of a flight envelope of a platform (e.g., an aircraft).

Disclosed examples enable optimization of propeller performance by adjusting a pitch of the propeller blades at specific portions of a flight envelope. Disclosed examples include an actuator to adjust the propeller blade between an upper position (e.g., a martensite phase of the SMA actuator) and a lower position (e.g., an austenite phase of the SMA actuator) by selectively heating and/or cooling the actuator. In some examples, the austenite phase temperature position does not require any power to maintain the corresponding blade pitch.

FIG. 1 shows an aircraft 100 that is powered by a pair of exposed propeller engines 102 and 104. The aircraft 100 comprises a fuselage 106, a left wing panel 108, a right wing panel 110, a plate or vertical stabilizer 112 attached to the fuselage 106, and a horizontal stabilizer 114 mounted on top of the plate 112 to form a T-tail. One exposed propeller engine 102 is mounted to the right wing panel 110, while the other exposed propeller engine 104 is mounted to the left wing panel 108. The exposed propeller engines 102, 104 may be mounted to the wing panels 108, 110 by any known method. For example, the wing may support an over-the-wing mounting of an exposed propeller engine nacelle in a slipper (i.e., no pylon or strut) fashion. The particular methods of attaching and/or integrating the engine nacelles with the wing via a slipper attachment are known to persons skilled in the art. Alternatively, the aft section of each engine 102, 104 could be mounted to a respective wing panel 108, 110 by means of a pylon or strut.

Figure 2:
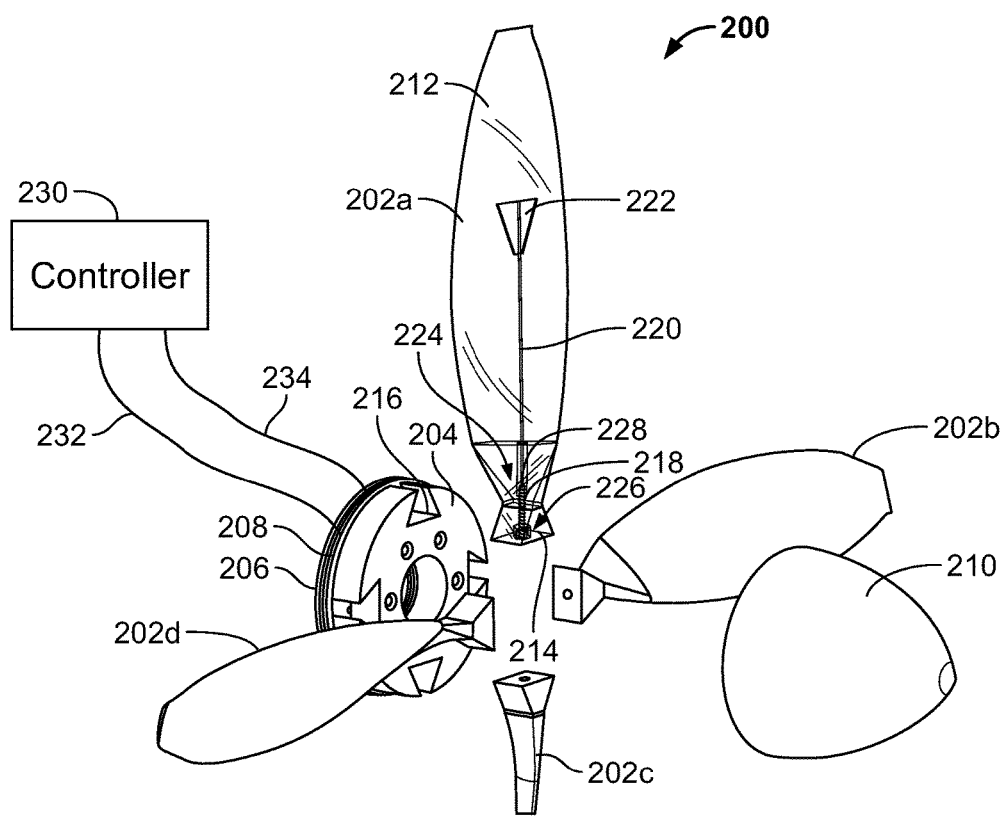
FIG. 2 shows an example shape memory alloy-actuated propeller assembly constructed in accordance with the teachings of this disclosure.

FIG. 2 is an illustration of an example SMA-actuated propeller assembly 200. The example assembly 200 of FIG. 2 may be used as a propeller assembly to implement the propeller engines 102, 104 of FIG. 1. The example assembly 200 includes four propeller blades 202a-202d, a propeller hub 204, slip rings 206, 208, and a nose cone 210. While the example assembly 200 includes four propeller blades 202a-202d, the following discussion will focus on the propeller blade 202a for brevity. However, the description of the propeller blade 202a is applicable to the other propeller blades 202b-202d. For example, components similar or identical to those that are described as being a part of the propeller blade 202a may also be used to implement one or more of the other propeller blades 202b-202d with similar or identical results. Furthermore, the example assembly 200 is not limited to having exactly four propeller blades 202a-202d. Instead, the example assembly 200 may have more or fewer propeller blades.

The example propeller blade 202a of FIG. 2 includes a propeller body 212 constructed of a deformable material. The example propeller body 212 includes a blade root 214 that secures the propeller blade 202a to a corresponding groove 216 in the propeller hub 204. The groove 216 is tapered to secure the propeller blade 202a to the propeller hub 204.

Figure 3:
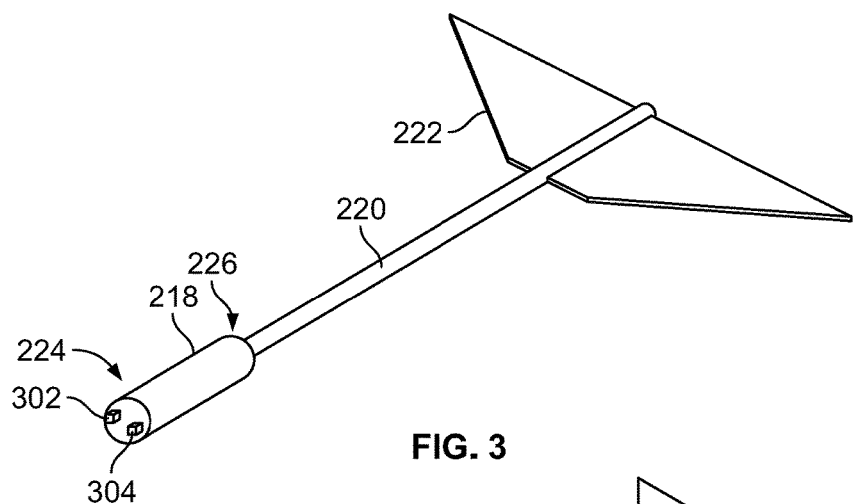
FIG. 3 illustrates an example shape memory alloy actuator that may be used to implement the example shape memory alloy-actuated propeller blade illustrated in FIG. 2.

The example propeller body 212 may be selectively deformed using an SMA actuator 218, which is coupled to the propeller body 212 by a torque transfer member (e.g., a torque tube 220) and a plate 222. The example plate 222 is embedded within the propeller body 212 such that, when the plate 222 is rotated, the adjacent portions of the propeller body 212 also rotate with respect to the axis of rotation of the plate 222. In the example of FIG. 2, the axis of rotation is along the torque tube 220. More detailed views of the example SMA actuator 218, the example torque tube 220, and the example plate 222 are shown in FIG. 3. The application of the torque distorts the blade propeller body 212 into a new pitch profile along the length of the blade Two-way shape memory materials are characterized by a shape transition upon heating from a martensite phase to an austenite phase, as well as upon cooling from the austenite phase back to the martensite phase. SMA structures that exhibit a two-way shape memory effect are fabricated from an SMA composition that reverts to its initial trained or remembered low-temperature shape. Two-way shape memory behavior is imparted by training the shape memory material through processing. Such processing can include extreme deformation of the material while in the austenite phase, and heating-cooling under constraint, load, and/or sheer. Once the material has been trained to exhibit the two-way shape memory effect, the shape change between the low and high temperature states is generally reversible and persists through a high number of thermal cycles.

The example SMA actuator 218 of FIG. 2 is coupled to the torque tube 220 at a first end 224 and is coupled to the blade root 214 at a second end 226. The second end 226 of the SMA actuator 218 is coupled to the blade root 214 so that the second end 226 does not rotate with respect to the blade root 214. Because the portion of the propeller body 212 adjacent the plate 222 rotates, but the blade root 214 does not, the rotation of the propeller body 212 results in a twist deformation of the propeller body 212.

Any suitable shape memory alloy may be used, such as nickel-titanium based alloys, nickel-titanium-platinum based alloys, indium-titanium based alloys, nickel-aluminum based alloys, nickel-aluminum-platinum based alloys, nickel-gallium based alloys, copper based alloys, gold-cadmium based alloys, iron-platinum based alloys, iron-palladium based alloys, silver-cadmium based alloys, indium-cadmium based alloys, manganese-copper based alloys, ruthenium-niobium based alloys, ruthenium-tantalum based alloys, titanium based alloys, iron based alloys, and the like.

The example SMA actuator 218 of FIG. 2 is in a cylindrical shape in its martensite phase. The transformation of the SMA actuator 218 from the martensite phase to the austenite phase results in the first end 224 of the SMA actuator 218 rotating or otherwise changing orientation with respect to the second end 226. While the second end 226 of the SMA actuator 218 is mechanically coupled to and/or constrained by the propeller body 212 (e.g., via complementary splines on the SMA actuator 218 and in the blade root 214), the first end 224 is not constrained by the propeller body 212.

When the SMA actuator 218 transforms from the martensite phase to the austenite phase, the example SMA actuator 218 applies a torque to the torque tube 220. The torque tube 220 transfers at least a portion of the torque to the plate 222. The application of torque to the plate 222 causes the plate 222 to rotate, causing a rotation in the part of the propeller body 212 and resulting in a deformation of the propeller body 212 (e.g., causing the propeller body 212 to twist). The torque applied by the SMA actuator 218 to the torque tube 220 is based on the amount of heat applied to the SMA actuator 218 (e.g., the temperature of the SMA actuator 218).

When the SMA actuator 218 transforms from the austenite phase to the martensite phase, the SMA actuator 218 relaxes the torque applied to the torque tube 220 and the plate 222. The relaxation of the torque permits the propeller body 212 to return to its initial trained shape. Therefore, by controlling the phase of the SMA actuator 218 to be in the martensite phase, the austenite phase, or at some point between the martensite and austenite phases, the example SMA actuator 218 controls a deformation of the propeller body 212.

While the foregoing example describes the austenite phase of the SMA actuator 218 as corresponding to a deformation of the propeller body 212 (e.g., a higher blade pitch), in other examples the propeller body 212 is constructed in a twisted configuration (e.g., a higher blade pitch, twisted relative to a typical propeller body shape) and the transition of the SMA actuator 218 from the martensite phase to the austenite phase untwists the propeller body 212 to reduce the blade pitch.

The example propeller blade 202a of FIG. 2 also includes a heater 228 configured to heat the SMA actuator 218. In the example of FIG. 2, the heater 228 is a resistive heating element. The heater 228 (e.g., an electrical heater) receives electrical current via the slip rings 206, 208 and conductors in the blade root 214, which are shown in more detail in FIG. 6.

One or more of the example SMA actuator 218, the example torque tube 220, and/or the example plate 222 may be embedded in the propeller body 212 at a time of manufacture of the propeller body 212. In other examples, the propeller body 212 is constructed and/or modified after manufacture to include appropriately-sized slots corresponding to one or more of the SMA actuator 218, the example torque tube 220, and/or the example plate 222. The ones of the SMA actuator 218, the example torque tube 220, and/or the example plate 222 that are not embedded in the propeller body 212 during manufacture may be inserted into the propeller body 212.

The example propeller assembly 200 of FIG. 2 further includes a controller 230 to control the SMA actuator 218 to control the profile of the example propeller blade 202a. The example propeller assembly 200 is connected to the slip rings 206, 208 and, thus, to the heater 228, via respective conductors 232, 234. The example controller 230 may be implemented by an onboard computer including a processor, a digital signal processor, or application specific integrated circuit, a dedicated propeller controller, and/or via any combination of software, firmware, and/or hardware.

The example controller 230 may receive and/or store calibration data about the SMA actuator 218 and/or the heater 228. Additionally, the controller 230 may receive and/or store flight envelope data corresponding to a platform in which the controller 230 is installed. Using the calibration data and/or the flight envelope data, the controller 230 determines appropriate pitch profile(s) for the propeller blades 202a-202d and controls the heaters 228 (e.g., via electrical current) to apply the appropriate heat to achieve the pitch profile(s).

To control a pitch profile, the controller 230 loads actuator calibration data and calculates a present flight envelope. The controller 230 calculates a propeller blade profile to achieve improved flight performance within the present flight envelope. The controller converts the calculated propeller blade profile to an actuator temperature, using the calibration data. The controller 230 then applies electrical signals to the SMA actuator 218 in the propeller 202a to achieve the calculated temperature(s) (and the corresponding pitch profile).

FIG. 3 is another view of the example SMA actuator 218 of FIG. 2. The example of FIG. 3 shows the SMA actuator 218, the torque tube 220, and the plate 222. As shown in FIG. 3, the SMA actuator 218 has a cylindrical shape.

Example splines 302, 304 are illustrated at the first end 224 of the SMA actuator 218. The splines 302, 304 may engage with the blade root 214 and/or with the propeller hub 204 to prevent the first end 224 of the SMA actuator 218 from rotating with respect to the blade root 214. While example splines 302, 304 are illustrated in FIG. 3, any other spline configuration may be used to prevent the first end 224 of the SMA actuator 218 from rotating with respect to the blade root 214. In some examples, the first end 224 of the SMA actuator 218 and the propeller body 212 (e.g., the blade root 214) include interlocking splines.

As shown in FIG. 3, the splines 302, 304 extend from the end face of the SMA actuator 218. However, as used here, splines are at a designated end of the SMA actuator (the first end or the second end) if the majority of the spline is closer to the designated end than the part of the spline that is closer to the non-designated end.

Figure 4:
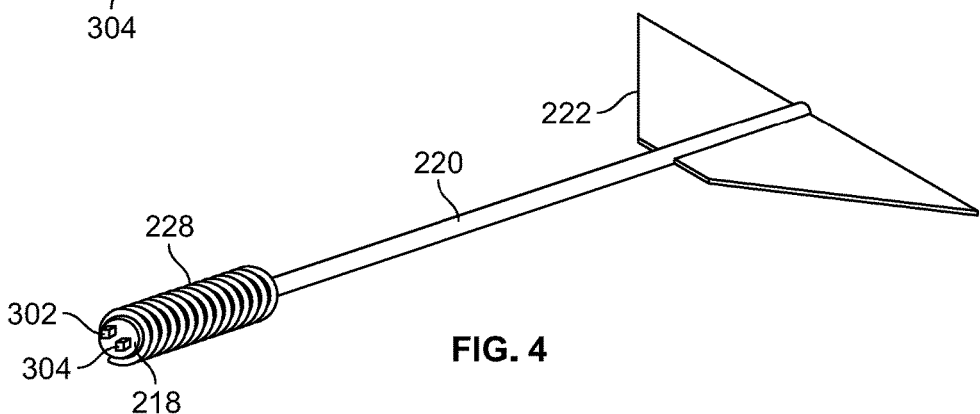
FIG. 4 illustrates an example heater with the example shape memory alloy actuator of FIG. 3.

FIG. 4 illustrates the example SMA actuator 218 of FIG. 3 and the heater 228 of FIG. 2. As shown in FIG. 4, the heater 228 is coiled around the SMA actuator 218 to provide substantially uniform heating around the exterior of the SMA actuator 218. In other examples, other heaters and/or heat management systems (e.g., combinations of heating and cooling systems) may be used.

Figure 5:
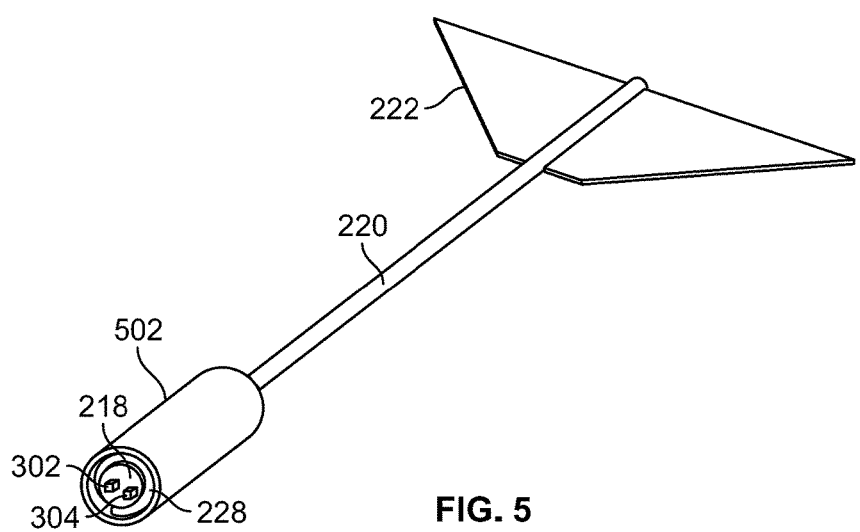
FIG. 5 illustrates an example heat shield with the heater of FIG. 4 and the example shape memory alloy actuator of FIG. 3.

FIG. 5 illustrates an example heat shield 502 surrounding the heater 228 of FIG. 4 and the example SMA actuator 218 of FIG. 3. The heat shield 502 may be used to protect (e.g., to reduce or prevent damage to) the propeller body 212 material. The example heat shield 502 is constructed to have a high thermal resistivity, due to the material(s) used and/or the shape of the heat shield 502.

Figure 6:
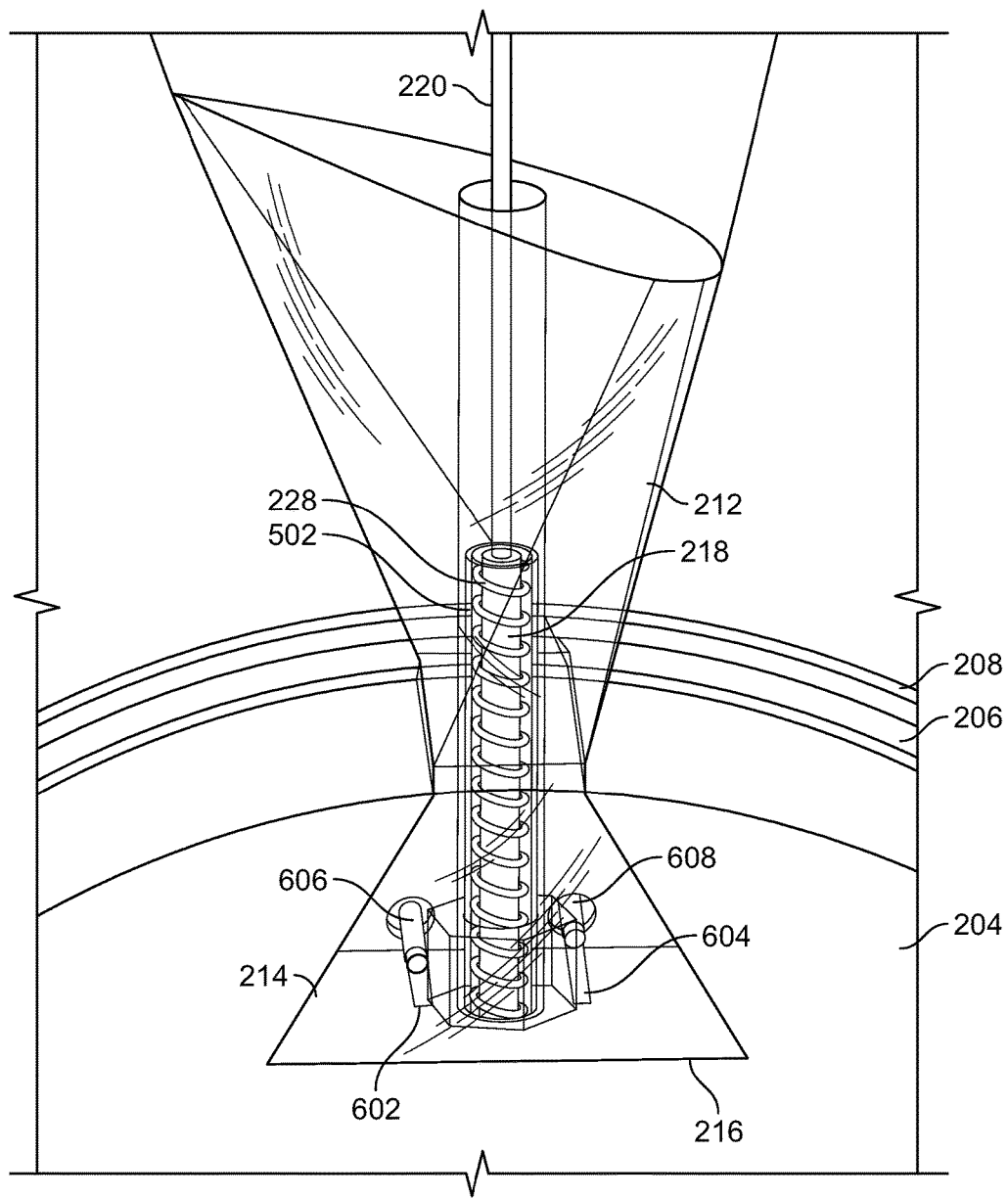
FIG. 6 is a more detailed view of a propeller hub and a blade root of the example shape memory alloy-actuated propeller assembly of FIG. 2.

FIG. 6 is a more detailed view of the example propeller hub 204 and the blade root 214 of FIG. 2. As shown in FIG. 6, the SMA actuator 218 extends outward from the blade root 214. The example of FIG. 6 also illustrates the position of the SMA actuator 218, the torque tube 220, the heater 228, and the heat shield 502.

The example heater 228 is connected to the slip rings 206, 208 to receive electrical current, from which the heater 228 generates the heat to cause the SMA actuator 218 to transform from the martensite phase to the austenite phase. The example heater 228 is connected to conductive strips 602, 604 at different respective ends of the heater 228. The conductive strip 602 is connected to a conductor 606 that contacts the slip ring 206 at a first voltage. The conductive strip 604 is connected to a conductor 608 that contacts the slip ring 208 at a second voltage (e.g., a common voltage, a ground reference, etc.). The strips 602, 604 and the conductors 606, 608 electrically couple the heater 228 to an exterior surface of the propeller blade 202a where contact can be made with the slip rings 206, 208.

The example slip rings 206, 208 are separated from each other and from the propeller hub 204 by insulating rings. The heater 228 completes an electrical circuit between the slip rings 206, 208 via the conductive strips 602, 602 and the conductors 606, 608.

While two slip rings 206, 208 are shown in FIGS. 2 and 6, in other examples the propeller assembly 200 has more slip rings to enable separate control of heaters in different ones of the propeller blades 202a-202d. For example, there may be one slip ring to provide separate power sources for each blade, and one additional slip ring to provide a return path for all of the blades. In such examples, the additional slip rings enable individual control of the pitches of the blades (e.g., to balance the blade thrusts in in response to an event that unbalances the blades 202a-202d).

Figure 7:
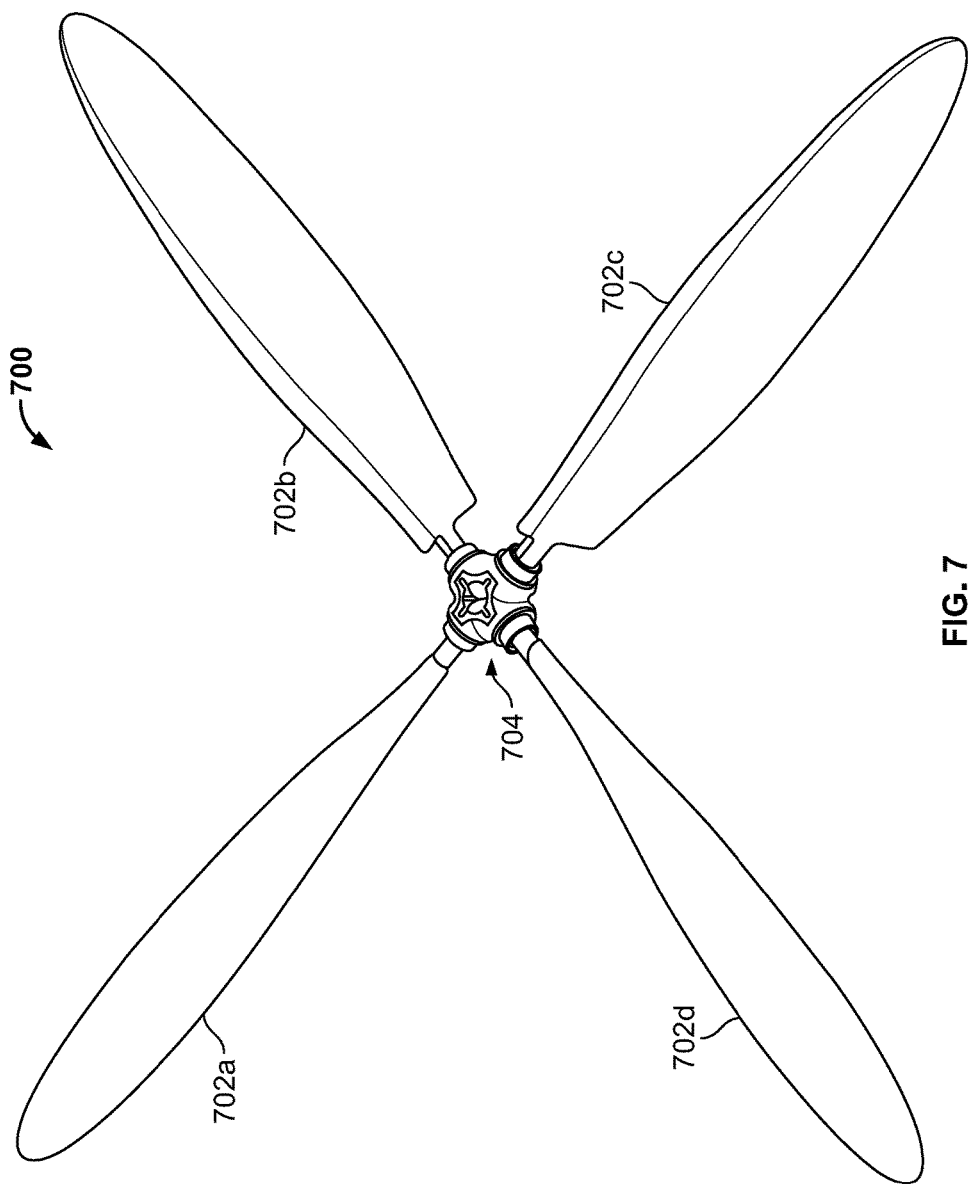
FIG. 7 shows another example shape memory alloy-actuated propeller assembly constructed in accordance with the teachings of this disclosure.

FIG. 7 is an illustration of another example SMA-actuated propeller assembly 700. The example assembly 700 of FIG. 7 includes four propeller blades 702a-702d connected to a propeller hub 704. In contrast with the example assembly 200 of FIG. 2 in which the blade pitch is adjusted by deformation (e.g., twisting) of the propeller blades 202a-202d, the example SMA-actuated propeller assembly 700 of FIG. 7 adjusts the blade pitch of the propeller blades 702a-702d by rotating the entireties of the propeller blades 702a-702d using respective SMA actuators. The SMA actuators are described in more detail below.

Figure 8:
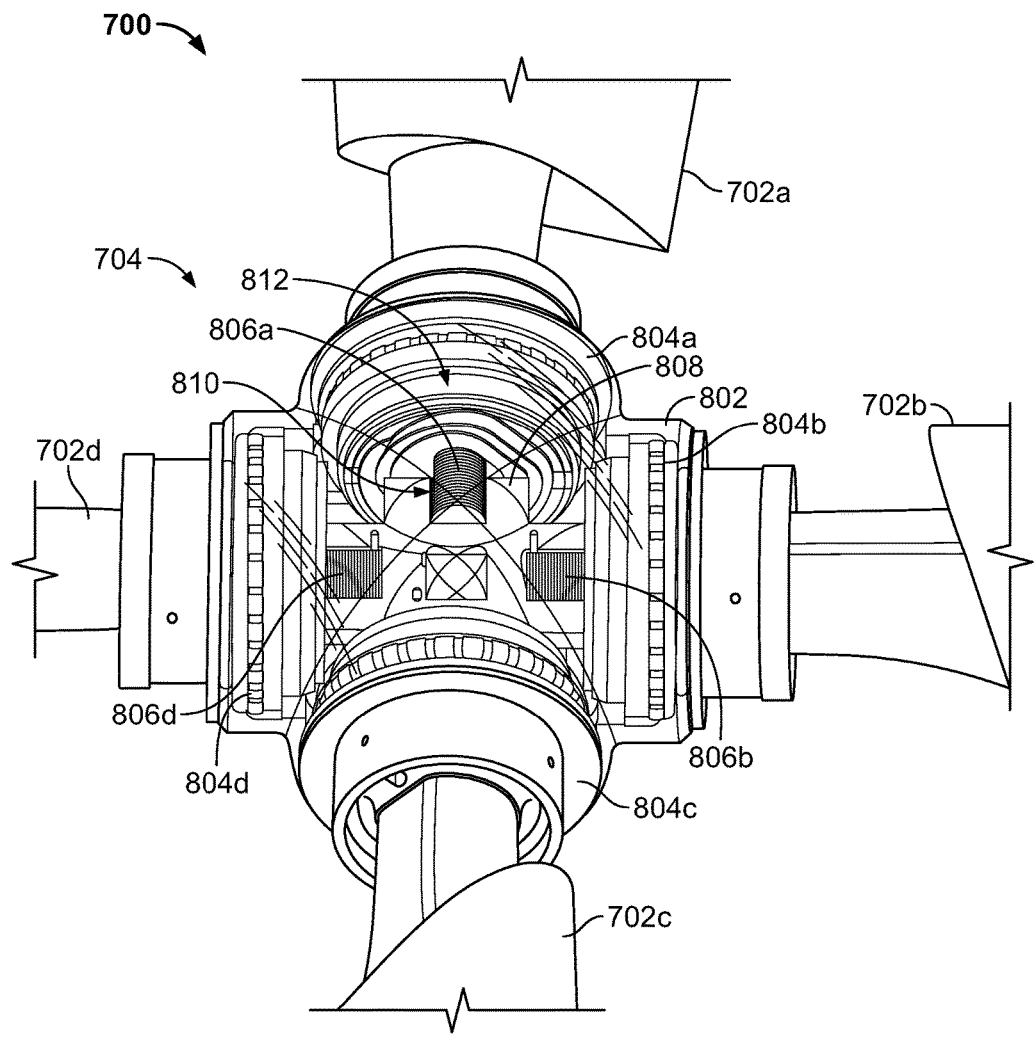
FIG. 8 is a more detailed view of a propeller hub of the example shape memory alloy-actuated propeller assembly of FIG. 7.

FIG. 8 is a more detailed view of the propeller hub 704 of the example SMA-actuated propeller assembly 700 of FIG. 7. The example propeller hub 704 includes a casing 802. The example propeller blades 702a-702d are coupled to the casing 802 via respective ring bearings 804a-804d, which hold the propeller blades 702a-702d to the casing 802 while permitting the propeller blades 702a-702d to rotate.

The example propeller hub 704 further includes SMA actuators 806a-806d. The SMA actuator 806c is obscured in FIG. 8, but can be seen in FIG. 9. Each of the SMA actuators 806a-806d is coupled to a respective one of the propeller blades 702a-702d. The SMA actuators 806a-806d are also coupled to a base plate 808 that is stationary with respect to the casing 802. In some examples, the base plate 808 is integral to the casing 802.

Referring to the example SMA actuator 806a, the SMA actuator 806a has a first end 810 that is attached to the base plate 808 and a second end 812 that is attached to the propeller blade 702a. In the example of FIG. 8, the first end 810 of SMA actuator 806a has one or more splines that, in combination with a corresponding spline or other feature of the base plate 808, prevent the first end 810 of the SMA actuator 806a from rotating with respect to the base plate 808. In other words, the mating of the SMA actuator 806a to the base plate 808 enables the base plate 808 to provide a foundation within the casing 802 from which torque can be applied by the SMA actuator 806a to rotate the propeller blade 702a to achieve different angles of attack.

The second end 812 of the SMA actuator 806a is attached or secured to the example propeller blade 702a. For example, the second end 812 of the SMA actuator 806a and the propeller blade 702 may have complementary splines that prevent rotation of the propeller blade 702a with respect to the second end 812 of the SMA actuator 806a.

The example SMA actuator 806a of FIG. 8 is in a cylindrical shape in its martensite phase. The transformation of the SMA actuator 806a from the martensite phase to the austenite phase results in the second end 812 of the SMA actuator 806a rotating with respect to the first end 810. While the first end 810 of the SMA actuator 806a is constrained by the base plate 808 (e.g., via complementary splines on the SMA actuator 806a and in the base plate 808), the second end 812 is not constrained by the base plate 808 or, more generally, by the casing 802.

When the SMA actuator 806a transforms from the martensite phase to the austenite phase, the example SMA actuator 806a applies a torque from the second end 812 to the first end 810. The application of torque by the SMA actuator 806a causes the propeller blade 702a to rotate. The temperature of the SMA actuator 806a (e.g., the degree to which the SMA actuator 806a transitions to the austenite phase) may be controlled to control an amount of rotation of the propeller blade 702a and, thus, the resulting pitch of the propeller blade 702a.

When the SMA actuator 806a transforms from the austenite phase to the martensite phase, the SMA actuator 806a decreases the torque applied to the propeller blade 702a. The decrease of the torque permits the propeller blade 702a to rotate to its initial position or pitch. Therefore, by controlling the phase of the SMA actuator 806a between the martensite phase, the austenite phase, or at some point between the phases, the example SMA actuator 806a controls a rotation and resulting pitch of the propeller blade 702a.

The example SMA actuators 806b-806d may apply similar torques to control the pitches of the respective propeller blades 702b-702d. In some examples, the SMA actuators 806a-806d are individually-controllable to adjust the propeller blades 702a-702d independently.

Figure 9:
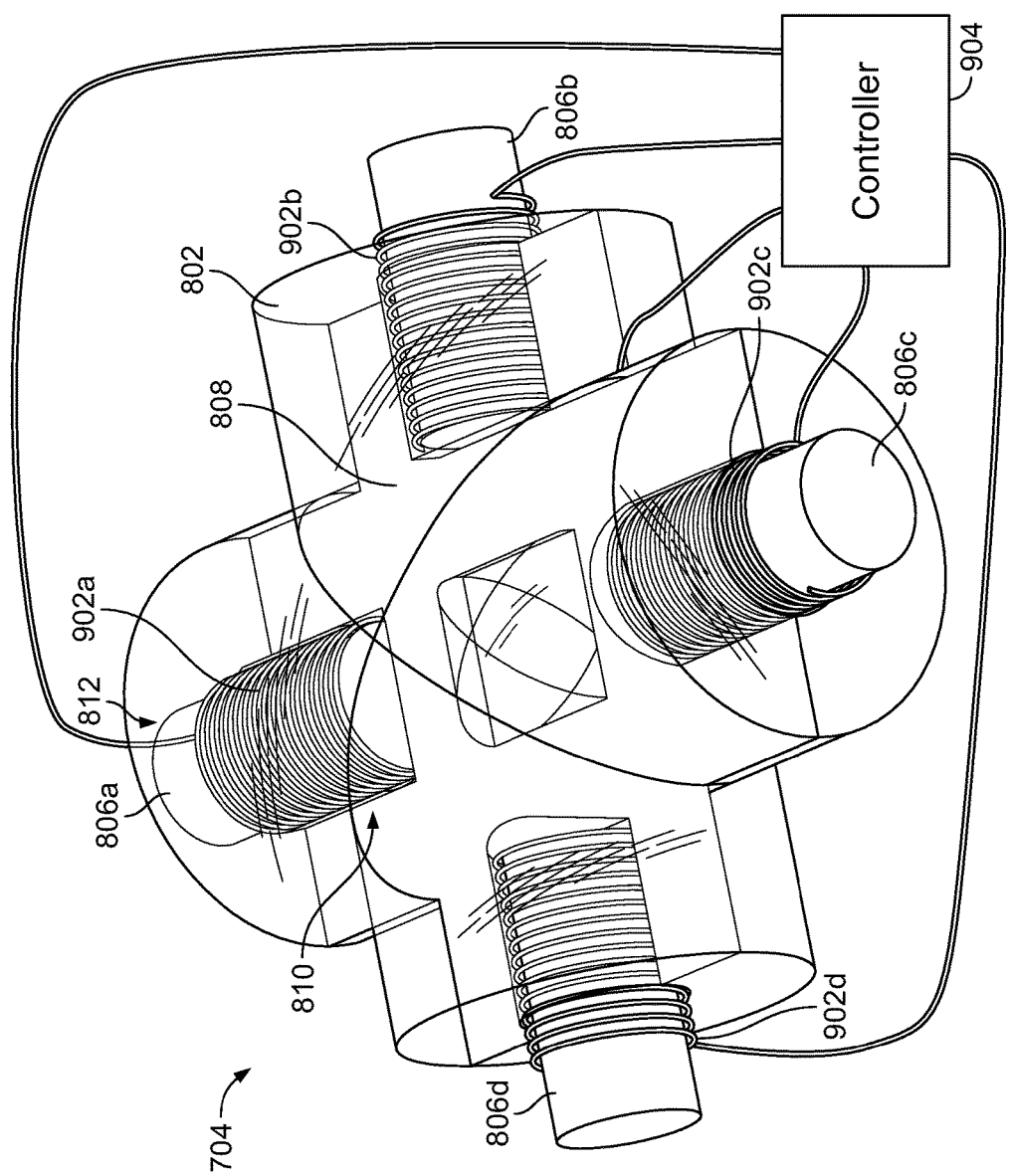
FIG. 9 is another view of the propeller hub of the example shape memory alloy-actuated propeller assembly of FIG. 7, including shape memory alloy actuators and corresponding heaters.

FIG. 9 is another view of the propeller hub 704 of the example SMA-actuated propeller assembly 700 of FIG. 7, including the SMA actuators 806a-806d and corresponding heaters 902a-902d. The example heater 902a may be similar to the heater 228 of FIG. 2. For example, the heater 902a of FIG. 9 is a resistive heater coiled around the SMA actuator 806a. The example heaters 902a-902d are electrically coupled to one or more power sources and/or control circuits. For example, the propeller assembly 700 of FIG. 7 may include slip rings to provide the electrical power to the heaters 902a-902d through the propeller hub 704 and the base plate 808.

The example propeller hub 704 of FIG. 9 also includes a controller 904, which is connected to the heaters 902a-902d via respective wired connections 906a-906d. The example controller 904 is also connected to a return path conductor 908, which provides a return path for the wired connections 906a-906d via the heaters 902a-902d. The separate wired connections 906a-906d and the return path conductor 908 enable individual control of the heaters 902a-902d by the controller 904. The example controller 904 may function to control the SMA actuators 806a-806d in a manner that is similar or identical to the controller 230 described above.

While disclosed examples are shown with cylindrical SMA actuators, other examples may have SMA actuators constructed to have polygonal cross-sections. When used in combination with a slot that has a close-fitting polygonal cross-section in the base plate 808 or the blade root 214, the use of a polygonal cross-section in the SMA actuator may eliminate the use of splines to secure the SMA actuators against rotation relative to other components.

Figure 10:
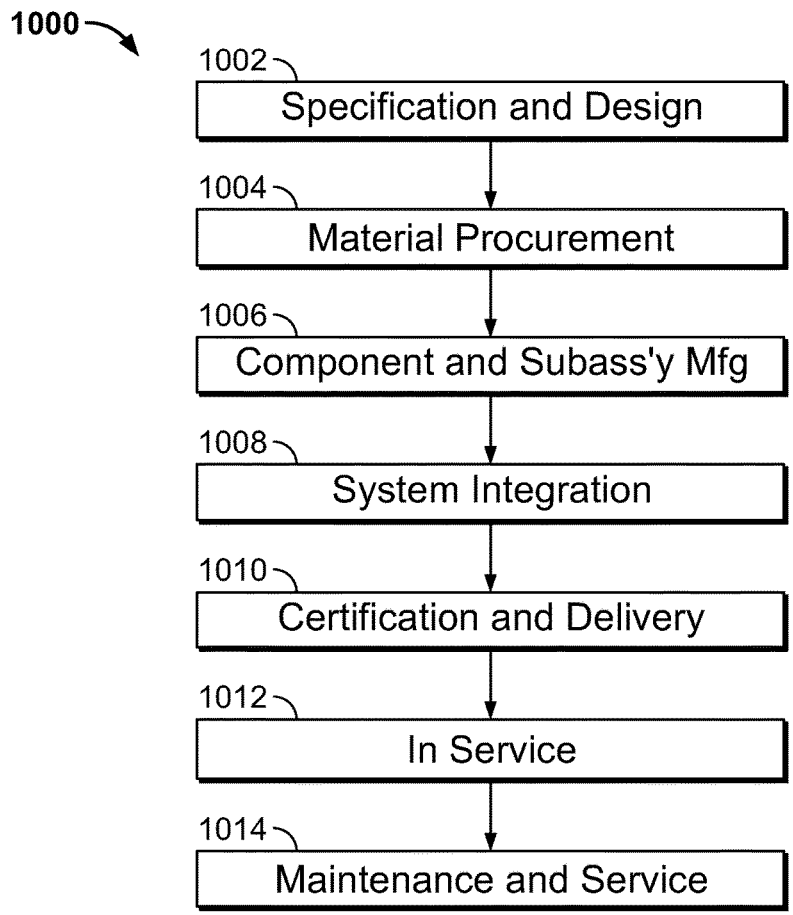
FIG. 10 is a flowchart of platform production and service methodology.
Figure 11:
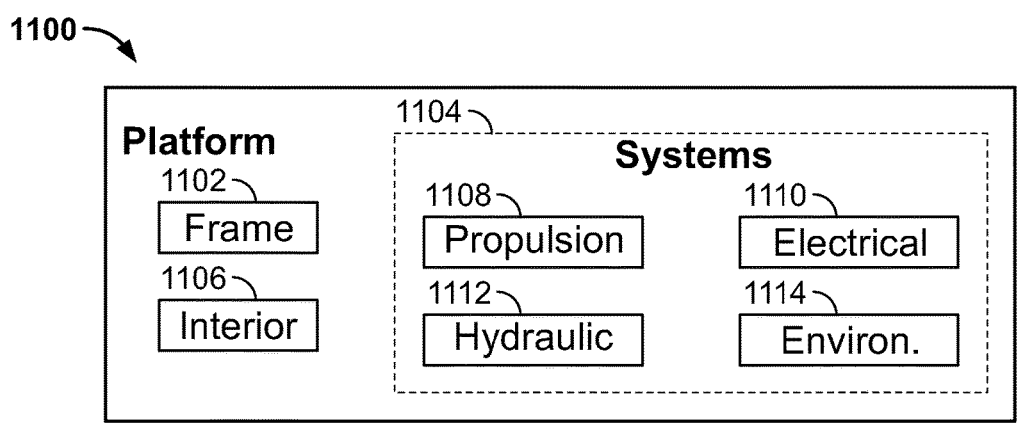
FIG. 11 is a block diagram of a platform.

Examples of the disclosure may be described in the context of a platform manufacturing and service method 1000 as shown in FIG. 10 and a platform 1100, such as an aircraft, as shown in FIG. 11. During pre-production, the example method 1000 may include specification and design (block 1002) of the platform 1100 (e.g., an aircraft). Pre-production may further include material procurement (block 1004). During production, component and subassembly manufacturing (block 1006) and system integration (block 1008) of the platform 1100 (e.g., an aircraft) takes place. The example propeller assembly 200, the propeller blades 202a-202d, and/or the propeller assembly 700 of FIGS. 2-9 may be constructed and/or assembled during the production, component, and/or subassembly manufacturing processes of block 1006. Thereafter, the platform 1100 (e.g., an aircraft) may go through certification and delivery (block 1010) in order to be placed in service (block 1012). While in service by a customer, the platform 1100 (e.g., an aircraft) is scheduled for routine maintenance and service (block 1014), which may also include modification, reconfiguration, refurbishment, etc.

Each of the operations of the example method 1000 may be performed or carried out by a system integrator, a third party, and/or an operator (e.g., a customer). For the purposes of this description, a system integrator may include without limitation any number of platform (e.g., aircraft) manufacturers and major-system subcontractors; a third party may include without limitation any number of venders, subcontractors, and suppliers; and an operator may be an airline, leasing company, military entity, service organization, and so on.

As shown in FIG. 11, the platform 1100 (e.g., an aircraft) produced by example method 1000 may include a frame 1102 with a plurality of systems 1104 and an interior 1106. Examples of high-level systems 1104 include one or more of a propulsion system 1108, an electrical system 1110, a hydraulic system 1112, and an environmental system 1114. The example systems and methods disclosed herein may be integrated into the example systems 1104, 1108, 1110. Any number of other systems may be included.

Apparatus and methods embodied herein may be employed during any one or more of the stages of the production and service method 1000. For example, components or subassemblies corresponding to production process 1006 may be fabricated or manufactured in a manner similar to components or subassemblies produced while the platform 1100 (e.g., an aircraft) is in service 1012. Also, one or more apparatus embodiments, method embodiments, or a combination thereof may be implemented during the production stages 1006 and 1008, for example, by constructing the propeller assemblies for a platform 1100 (e.g., an aircraft). One or more apparatus embodiments, method embodiments, or a combination thereof may be implemented during the service stage 1012 by, for example, adjusting the blade pitch of one or more propeller blades in response to determining a flight envelope. Similarly, one or more of apparatus embodiments, method embodiments, or a combination thereof may be utilized while the platform 1100 (e.g., an aircraft) is in service 1012, for example and without limitation, to maintenance and service 1014.

Figure 12:
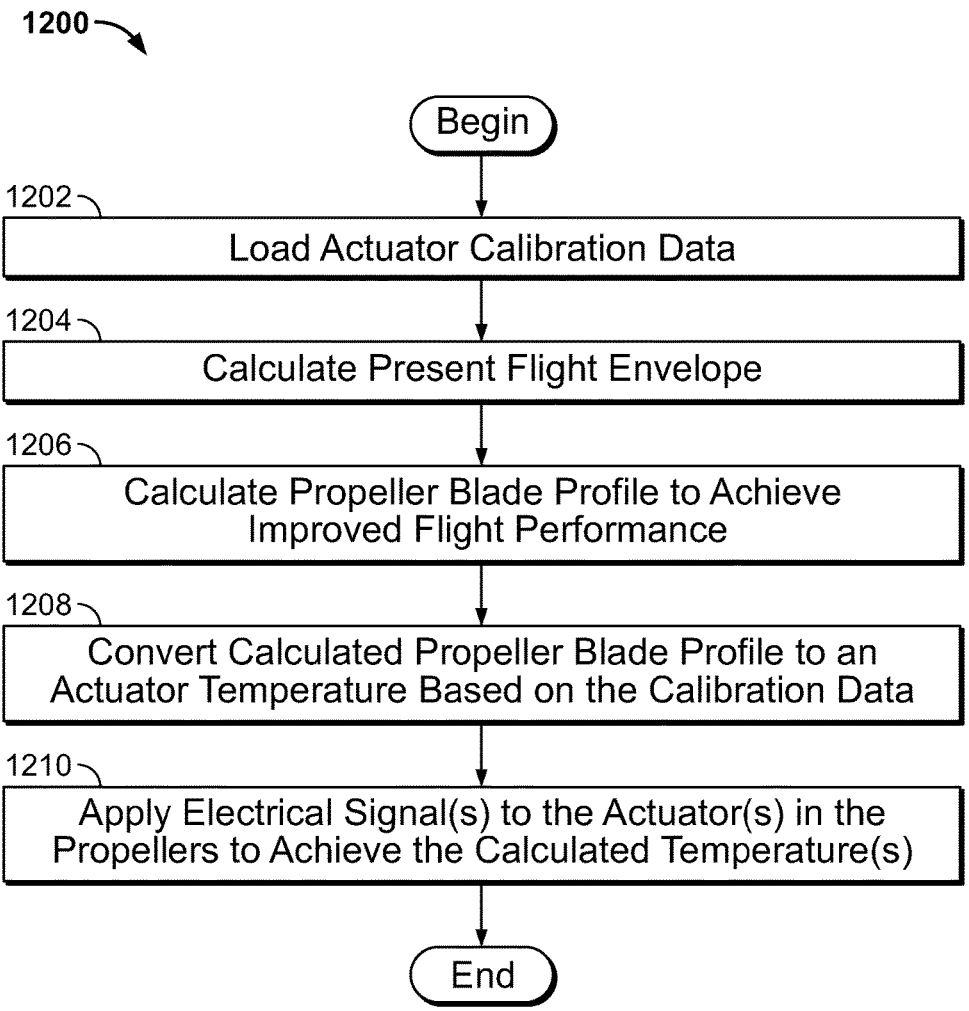
FIG. 12 is a flowchart representative of an example process to adjust a propeller blade profile.

FIG. 12 is a flowchart representative of an example process 1200 to adjust a propeller blade profile. The example process 1200 may be performed to implement the example controllers 230, 904 of FIGS. 2 and/or 9. The example process 1200 is an example process that may be used to control the SMA actuators 218, 806a-806d. However, other processes may additionally or alternatively be used. The process 1200 is described below with reference to the example of FIG. 2 above. However, the processor 1200 may also be applied to the example of FIG. 9 above.

To control a pitch profile, the controller 230 loads actuator calibration data (1202) and calculates a present flight envelope (block 1204). The controller 230 calculates a propeller blade profile to achieve improved flight performance within the present flight envelope (block 1206). The controller converts the calculated propeller blade profile to an actuator temperature, using the calibration data (block 1208). The controller 230 then applies electrical signals to the SMA actuator 218 in the propeller 202a to achieve the calculated temperature(s) (and the corresponding pitch profile) (block 1210). The example process 1200 may then end and/or iterate to continue controlling the propeller pitch profile(s).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A propeller blade, comprising:
   a propeller body;
   a bearing assembly to couple the propeller body to a propeller hub, the bearing assembly to allow the propeller body to rotate relative to the propeller hub; and
   a shape memory alloy actuator having a first end and a second end, the first end of the shape memory alloy actuator being attached to a base plate of the propeller hub, the second end of the shape memory alloy actuator being coupled to the propeller body, the shape memory alloy actuator being configured to apply torque to rotate the propeller body in response to an application of heat to the shape memory alloy actuator.

2. The propeller blade as defined in claim 1, wherein the shape memory alloy actuator includes a nickel-titanium based alloy.

3. The propeller blade as defined in claim 1, further including an electrical heater to apply the heat to the shape memory alloy actuator.

4. The propeller blade as defined in claim 1, wherein the torque is based on an amount of the heat applied to the shape memory alloy actuator.

5. The propeller blade as defined in claim 1, wherein the first end of the shape memory alloy actuator includes a spline to matably engage the base plate of the propeller hub to prevent the first end of the shape memory alloy from rotating relative to the base plate.

6. The propeller blade as defined in claim 1, wherein the first end of the shape memory alloy actuator and the base plate of the propeller hub include interlocking splines.

7. A propeller assembly, comprising:
   a propeller hub;
   a propeller blade attached to the propeller hub via a bearing assembly, the propeller blade including:
      a propeller body; and
      a shape memory alloy actuator having a proximal end and a distal end, the distal end of the shape memory alloy actuator being mated to the propeller body and the proximal end of the shape memory alloy actuator being mated to the propeller hub such that, when heated, the shape memory alloy actuator causes the propeller body to rotate about an axis extending through the shape memory alloy actuator; and
   a heater to apply heat to the shape memory alloy actuator.

8. The propeller assembly as defined in claim 7, wherein the shape memory alloy actuator includes a nickel-titanium based alloy.

9. The propeller assembly as defined in claim 7, further including a second propeller blade attached to the propeller hub via a second rotating bearing, the second propeller blade including:
   a second propeller body; and
   a second shape memory alloy actuator having a proximal end and a distal end, the distal end of the second shape memory alloy actuator being mated to the second propeller body and the proximal end of the second shape memory alloy actuator being mated to the propeller hub such that, when heated, the second shape memory alloy actuator causes the second propeller body to rotate about a second axis extending through the second shape memory alloy actuator.

10. The propeller assembly as defined in claim 7, wherein the shape memory alloy actuator has a first spline at the proximal end of the shape memory alloy actuator and the propeller hub has a second spline, the first and second splines to prevent rotation of the proximal end of the shape memory alloy actuator about an axis extending through the shape memory alloy actuator with respect to the propeller hub.

11. The propeller assembly as defined in claim 7, wherein the shape memory alloy actuator has a first spline at the distal end of the shape memory alloy actuator and the propeller body has a second spline, the first and second splines to prevent rotation of the distal end of the shape memory alloy actuator about an axis extending through the shape memory alloy actuator with respect to the propeller body.

* * * * *